(12) United States Patent
Or et al.

(10) Patent No.: US 7,210,143 B2
(45) Date of Patent: Apr. 24, 2007

(54) DEPLOYMENT OF APPLICATIONS IN A MULTITIER COMPUTE INFRASTRUCTURE

(75) Inventors: Yan Or, San Ramon, CA (US); Johan Casier, San Jose, CA (US); Krishna Garimella, San Jose, CA (US); Umesh Bellur, Sunnyvale, CA (US); John Koper, San Francisco, CA (US); Shashank Joshi, San Jose, CA (US); Vinu Sundaresan, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 10/379,617

(22) Filed: Mar. 4, 2003

(65) Prior Publication Data

US 2006/0184926 A1    Aug. 17, 2006

Related U.S. Application Data

(60) Provisional application No. 60/396,666, filed on Jul. 17, 2002.

(51) Int. Cl.
G06F 9/445 (2006.01)
G06F 9/44 (2006.01)

(52) U.S. Cl. .................. 717/174; 717/176; 717/177

(58) Field of Classification Search ........ 717/168–172, 717/174–178
See application file for complete search history.

(56) References Cited

U.S. PATENT DOCUMENTS

| 4,558,413 | A | 12/1985 | Schmidt et al. |
| 4,951,192 | A | 8/1990 | Chase, Jr. et al. |
| 5,724,556 | A | 3/1998 | Souder et al. |
| 5,867,714 | A | 2/1999 | Todd et al. |
| 5,889,520 | A | 3/1999 | Glaser |
| 6,085,198 | A | 7/2000 | Skinner et al. |
| 6,202,207 | B1 | 3/2001 | Donohue |
| 6,405,251 | B1 | 6/2002 | Bullard et al. |
| 6,411,956 | B1 | 6/2002 | Ng |
| 6,418,554 | B1 * | 7/2002 | Delo et al. ................... 717/174 |
| 6,425,126 | B1 | 7/2002 | Branson et al. |
| 6,490,722 | B1 * | 12/2002 | Barton et al. ............... 717/174 |
| 6,539,425 | B1 | 3/2003 | Stevens et al. |
| 6,550,061 | B1 * | 4/2003 | Bearden et al. ............. 717/174 |
| 6,574,635 | B2 | 6/2003 | Stauber et al. |
| 6,606,744 | B1 * | 8/2003 | Mikurak ...................... 717/174 |
| 6,658,659 | B2 * | 12/2003 | Hiller et al. ................. 717/170 |
| 6,665,867 | B1 * | 12/2003 | Ims et al. .................... 717/173 |
| 6,681,391 | B1 * | 1/2004 | Marino et al. .............. 717/175 |
| 6,754,896 | B2 * | 6/2004 | Mishra et al. .............. 717/176 |
| 6,760,748 | B1 * | 7/2004 | Hakim ....................... 709/204 |

(Continued)

OTHER PUBLICATIONS

Hollingsworth et al, "using content derived names for configuration management", ACM SSR, pp. 104-109, 1997.*

(Continued)

*Primary Examiner*—Anil Khatri
(74) *Attorney, Agent, or Firm*—David W. Victor; Konrad Raynes & Victor LLP

(57) ABSTRACT

An application model automates deployment of an application. In one embodiment, the application model includes a static description of the application and a run-time description of the application. Deployment phases, such as installation, configuration and activation of the application are executed according to the application model.

37 Claims, 12 Drawing Sheets

U.S. PATENT DOCUMENTS

| | | | |
|---|---|---|---|
| 6,854,112 B2 * | 2/2005 | Crespo et al. | 717/174 |
| 6,892,382 B1 * | 5/2005 | Hapner et al. | 717/174 |
| 6,931,546 B1 * | 8/2005 | Kouznetsov et al. | 717/174 |
| 6,944,858 B2 * | 9/2005 | Luu | 717/174 |
| 6,954,930 B2 * | 10/2005 | Drake et al. | 717/178 |
| 6,986,135 B2 * | 1/2006 | Leathers et al. | 717/177 |
| 7,051,211 B1 * | 5/2006 | Matyas et al. | 713/187 |
| 7,080,371 B1 * | 7/2006 | Arnaiz et al. | 717/170 |
| 7,107,588 B2 * | 9/2006 | Gentry | 717/176 |
| 7,117,495 B2 * | 10/2006 | Blaser et al. | 717/174 |
| 2001/0047251 A1 | 11/2001 | Kemp | |
| 2002/0069163 A1 | 6/2002 | Gilbert | |
| 2002/0174059 A1 | 11/2002 | Guo | |

OTHER PUBLICATIONS

Santinelli et al,"Installing and configuring application software on the LHC compuring grid", IEEE, E Science, pp. 1-8, 2005.*

Dolstra et al, "Service configuration management", ACM SCM pp. 83-98, 2005.*

Hall et al, "A cooperative approach to support software deployement using software dock", ACM ICSE, pp. 174-183, 1991.*

PCT/USO3/21401, Not Yet Published, PCT International Search Report dated Oct. 23, 2003.

Oppenheimer, David. The importance of understanding distributed system configuration. System Administrators are Users, Too: Designing Workspaces for Managing Internet-Scale Systems CHI 2003 (Conference on Human Factors in Computing Systems) workshop, Apr. 2003. 3 pages.

U.S. Patent Application entitled "Service Descriptor for a Multitier Compute Infrastructure", U.S. Appl. No. 10/366,958, filed Feb. 13, 2003, by inventors S. Joshi, U. Bellur, Y. Or, K. Garimella and V. Sundaresan.

U.S. Patent Application entitled "Topology Mapping of a Multitier Compute Infrastructure", U.S. Appl. No. 10/365,185, filed Feb 11, 2003, by inventors Y. Or, J. Casier, K. Garimella, U. Bellur, J. Koper, S. Joshi, G. Chandler and V. Sundaresan.

U.S. Patent Application entitled "Business Service for a Multitier Compute Infrastructure", U.S. Appl. No. 10/366,817, filed Feb. 13, 2003, by inventors S. Joshi, U. Bellur, Y. Or, J. Koper and V. Sundaresan.

U.S. Patent Application entitled "Automated Discovery of a Multitier Compute Infrastructure", U.S. Appl. No. 10/391,124, filed Mar. 17, 2003, by inventors Y. Or, J. Casier, K. Garimella, U. Bellur, J. Koper, S. Joshi, G. Chandler and V. Sundaresan.

* cited by examiner

Application Model

Definition (450)

ApplicationDef (451)    Order Management System

| PackageDef (455) | Package (457) | Static Installation Dependency (459) |
|---|---|---|
| | portal.war | common.jar |
| | ordertracking.jar | common.jar |
| | shoppingcart.jar | common.jar |
| | schema.tar | |
| | common.jar | |

| SoftwareComponentDef (460) | Software Component | Contained in Package |
|---|---|---|
| | LoginServlet | portal.war |
| | OrderEntryServlet | portal.war |
| | OrderStatuesServlet | portal.war |
| | OrderTrackerEJB | ordertracking.jar |
| | ShoppingCartEJB | shoppingcart.jar |

| ManagedServicesDef (465) | Managed Service (466) | Run-time Installation Dependency (467) | Configuration Dependency (468) | Activation Dependency (469) |
|---|---|---|---|---|
| | portal | portal.war | | orderserver |
| | | common.jar | | |
| | orderserver | ordertracking.jar | orderserver | orderdb |
| | | shoppingcart.jar | | |
| | | common.jar | | |
| | orderdb | schema.tar | orderserver | |

FIG. 4A

Application Model

Configuration (470)

ApplicationConfig (471)　Order Management System – Production Config

PackageConfig (475)

Instance (476)　　　　　Installations (477)　　　　　　　　　　　　　　　　　　Configurations (478)
portal on 10.10.10.1　　portal.war -> /opt/wis7.0/deploy/applications　　listening port = 80
　　　　　　　　　　　common.jar -> /opt/wis7.0/deploy/lib　　　　　　　　max memory = 128M orderserver on 10.10.10.2　ordertracking.jar -> /opt/wis7.0/deploy/applications　listening port = 7001
　　　　　　　　　　　　shoppingcart.jar -> /opt/wis7.0/deploy/applications　max memory = 256M
　　　　　　　　　　　　common.jar -> /opt/wis7.0/deploy/lib　　　　　　　　cluster = enabled orderserver on 10.10.10.3　ordertracking.jar -> /opt/wis7.0/deploy/applications　listening port = 7001
　　　　　　　　　　　　shoppingcart.jar -> /opt/wis7.0/deploy/applications　max memory = 256M
　　　　　　　　　　　　common.jar -> /opt/wis7.0/deploy/lib　　　　　　　　cluster = enabled orderdb on 10.10.10.4　　schema.tar -> /tmp　　　　　　　　　　　　　　　run custom script /tmp/create.sql SoftwareComponentConfig (480)

Instance (481)　　　　　　　　　　　　　Configurations (483)
OrderTrackerEJB　　　　　　　　　　　　initial pool size = 10
(orderserver on 10.10.10.2)　　　　　　max pool size = 100

OrderTrackerEJB　　　　　　　　　　　　initial pool size = 10
(orderserver on 10.10.10.3)　　　　　　max pool size = 100

ShoppingCartEJB　　　　　　　　　　　　initial pool size = 50
(orderserver on 10.10.10.2)　　　　　　max pool size = 300

ShoppingCartEJB　　　　　　　　　　　　initial pool size = 50
(orderserver on 10.10.10.3)　　　　　　max pool size = 300

FIG. 4B

Run-time Summary of Order Management System – Production (490)

Managed Services (491)
ApacheServer "portal" on 10.10.10.1:80
WebLogic Server "orderserver" on 10.10.10.2:7001
WebLogic Server "orderserver" on 10.10.10.3:7001
OracleInstance "ordb" 10.10.10.4:1521

Packages (493)
portal.war on 10.10.10.1
common.jar on 10.10.10.1
ordertracking.jar on 10.10.10.2
shoppingcart.jar on 10.10.10.2
common.jar on 10.10.10.2
ordertracking.jar on 10.10.10.3
shoppingcart.jar on 10.10.10.3
common.jar on 10.10.10.3
schema.tar on 10.10.10.4

Software Components (495)
OrderTrackerEJB in 10.10.10.2:7001
ShoppingCartEJB in 10.10.10.2:7001
OrderTrackerEJB in 10.10.10.3:7001
ShoppingCartEJB in 10.10.10.3:7001

FIG. 4C

DEPLOYMENT OF APPLICATIONS IN A MULTITIER COMPUTE INFRASTRUCTURE

CROSS-REFERENCE TO RELATED APPLICATIONS

This application claims priority under 35 U.S.C. § 119(e) to U.S. Provisional Patent Application Ser. No. 60/396,666, "Operational Automation Platform for Component Architectures," by Casier Johan et al., filed Jul. 17, 2002. This application relates to U.S. patent application Ser. No. 10/365,185, "Topology Mapping of a Multitier Compute Infrastructure," by Or et al., filed Feb. 11, 2003. The subject matter of the foregoing is incorporated herein by reference in its entirety.

BACKGROUND OF THE INVENTION

1. Field of the Invention

This invention relates generally to the deployment of applications in a multitier compute infrastructure, including those that host multitier applications. In a specific embodiment, it relates to the deployment of multitier applications that are based on a software component architecture, for example the Java 2 Platform, Enterprise Edition (J2EE)™ or .NET™ (J2EE is a Trademark of Sun Microsystems, Inc. and .NET is a trademark of Microsoft Corp.)

2. Description of the Related Art

With advances in computing, networking and software technology, an increasing number of applications are implemented on multitier compute infrastructures. For example, many Internet applications are implemented on a compute infrastructure that can be divided into three tiers: network, compute and application. One advantage of a multitier compute infrastructure is that different tiers can function at different "levels" while still interoperating with each other. In the three-tier example, the network tier operates at the "lowest" level of the infrastructure, the compute tier operates on top of that, and the application tier operates at the "highest" level. As a result, enterprise and other applications can be distributed among the tiers in a fashion that results in greater optimization and utilization of the infrastructure. For example, if a certain functionality is desired, it is not required that the functionality be implemented in a monolithic piece of software installed on a particular computer in a specific location within the network. Rather, the overall functionality can be distributed among different components within the multitier compute infrastructure.

Software component architectures, such as Java 2, Enterprise Edition (J2EE)™ and .NET™, are one approach that takes advantage of this flexibility. Software functionality is divided among different software components, each of which can run on a different computer located at a different network address. Each of the software components, computers and the network topology can be optimized for efficiency, security, scalability or other factors. For example, in the monolithic approach, a single code base and a single computer may be called upon to handle user requests for enhanced images, retrieve raw images from a large image warehouse and perform complex calculations to enhance the images. With the component approach, one software component and server could handle user requests, another could retrieve images, and a third could perform the calculations. Each of these can be optimized for its specific task and the same components can be used for more than one application. The overall enterprise is also more scalable since incremental capacity can be added by adding more components.

One drawback of the multitier and software component approaches is that, typically, many components are used in order to implement the desired functionality. For example, the software portion can be implemented by a large number of software components, each possibly executing on a different server, with the servers located on different networks. Software components may not even be executing on the same server each time. The real-time execution load can be load balanced among a server farm, for example. Currently, it is not uncommon for an enterprise application to have thousands of moving parts, many of which must work in tandem with each other in order for the overall enterprise application to function properly. In addition, multiple relationships between components exist within each tier, as well as across tiers of the compute infrastructure. For example, in the application tier, a web server and application server might work together to handle user requests. Cross-tier relationships, such as those linking the web server, DNS server and access router with each other, can be more complex but these often are the relationships that have a direct bearing on the availability, performance and security of the overall application.

Due to this increased complexity, managing a multitier compute infrastructure and the applications implemented on the infrastructure is more difficult. Tasks such as installing, configuring, activating, updating and monitoring enterprise functions are more complex compared to a situation where a monolithic piece of code executes on a single computer in a fixed network location. This is aggravated by the fact that the component approach can significantly reduce the development cycle time. It is not uncommon to have a J2EE™ application undergo ten to twelve updates each calendar year, with two of those being major upgrades to underlying functionality. In the meantime, it is increasingly more difficult to manage the application and its updates, including for example the tasks of merely installing and correctly configuring the updates.

Enterprise management capability has not kept pace with the shorter development cycle. For example, the task of updating the deployment of an application is largely a manual task, even today. Initially, the deployment team assembles the various software components that make up the application (i.e., the software packages), manually scans configuration files, and checks them against system documentation and physical network and compute configurations for consistency and completeness. The product of this effort is an inventory that should pinpoint omissions or conflicts prior to staging of the application. However, as the scope of enterprise applications expands and the different tiers become more distributed, the likelihood of uncovering all issues and of successfully deploying an application on the first try decreases.

Problems in an unsuccessful deployment typically are addressed by troubleshooting after the deployment. But troubleshooting can be time-consuming as the root causes may depend on complex cross-tier relationships. Not only does this add expense but it can also result in lost revenue as successful deployment of the application is delayed. In addition, cross-tier troubleshooting and, more generally, the management of a multitier compute infrastructure are most effectively performed by dedicated teams whose members are skilled in the application, compute and network tiers. It can be difficult to find these people and the IT headcount can be the limiting factor on scaling up an enterprise operation.

Part of the problem is that currently available management tools are mostly limited to a single tier. This is because many of these tools were developed for system administrators who were responsible only for a single tier. That is, one system administrator would be responsible for networking, another for computers, and another for software loaded on the computers. Single-tier tools would give some visibility into the tier for which the system administrator had responsibility, but did not, give visibility into cross-tier relationships or interactions. This is problematic since the trend is towards more numerous and more complex cross-tier relationships. For example, single-tier tools typically are not sophisticated enough to enable an application deployment team to anticipate and avoid problems in the deployment of applications since many of these problems may be the result of cross-tier relationships. An alternative is to manually piece together the required relationships, one tier at a time, and often using knowledge that resides only in some key employee's head. But this is both time-consuming and risky—for example, if the key employee were to leave the company.

Others are attempting to address these shortcomings. For example, some efforts focus on fast and/or automated installation of software. Loudcloud and CenterRun are two companies that appear to have efforts in this area. These tools automate some of the software installation process. For example, if a patch is to be distributed to 100 instances of an operating system, this tool might automate that process. However, in order to use this tool, someone must know where the 100 instances are located and how to properly configure the patches. Furthermore, if the patch itself requires an update in some other piece of software in order to run properly, someone must also remember that. Hence, these tools might reduce the cost and error of physically installing the patches, but they do not increase cross-tier visibility. Nor do they provide a complete ability to fully deploy an application. For example, these tools have limited or no capability to configure software once installed, to verify that the installation and configuration were performed properly, and/or to verify that the correct versions of supporting hardware and/or software are available.

Thus, there is a need for better tools and techniques for deploying applications in a multitier compute infrastructure, including applications that are implemented based on a software component architecture.

SUMMARY OF THE INVENTION

The present invention overcomes the limitations of the prior art by providing an application model that automates deployment of an application, including for example multitier applications. In one embodiment, the application model includes a static description of the application and a run-time description of the application. For example, the static description can include identification of the packages that make up the application, identification of specific installations of the packages and/or a description of static installation dependencies. The run-time description can include identification of managed services (i.e., the run-time components), identification of specific configurations of the managed services and/or run-time dependencies. Examples of run-time dependencies include run-time installation dependencies, configuration dependencies, and activation dependencies, as will be further described below.

In one approach, the deployment process is divided into phases, including installation, configuration and activation. The application model is accessed for information that is used in one or more of the deployment phases. For example, packages can be installed on their target devices (to produce installations) according to the static description in the application model. Or the installations can be configured (to produce configurations) according to the run-time description in the application model. Or the configurations can be activated according to the run-time description.

In one embodiment, the installation phase includes check-in and/or pre-install. With check-in, packages are checked-in and the checked-in packages are installed. Version control of the packages can be implemented as part of the check-in process. This way, if a package is already installed (or-pre-installed) and an update of the package is later checked-in, the updated package can be automatically installed (or pre-installed) in place of the previous version of the package. With pre-install, packages are pre-installed and the installation is completed post-cutover. In one approach, packages are pre-installed at a temporary location on the target device and then moved to the final destination post-cutover.

In another aspect of the invention, the deployment phases are executed according to dependencies that affect the phases. In some cases, dependencies are verified before a phase is executed. For example, if a static installation dependency states that package X must be available before package Y can be installed, it is prudent to verify the dependency (i.e., that X is available) before installing package Y. Other dependencies can affect the order of execution of a phase. For example, if a configuration dependency states that service X must be available in order for service Y to function properly, it is prudent to configure service X before configuring service Y. Dependencies can have both effects.

In another aspect of the invention, the application (or parts of it) are based on a software component architecture, such as J2EE™. Thus, the installation, configuration and activation phases can include the installation, configuration and activation of software components, such as Enterprise Java Beans™ (EJB™s) (Enterprise Java Beans and EJB are trademarks of Sun Microsystems, Inc.) In one implementation, at least one configuration is based on software containers and process pools.

Other aspects of the invention include software, systems, devices and user interfaces relating to the application model and methods described above.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 4A–4B are another example of an application model.

FIG. 4C summarizes deployment of the application modeled in FIGS. 4A–4B.

DETAILED DESCRIPTION OF THE PREFERRED EMBODIMENTS

Figure 1:
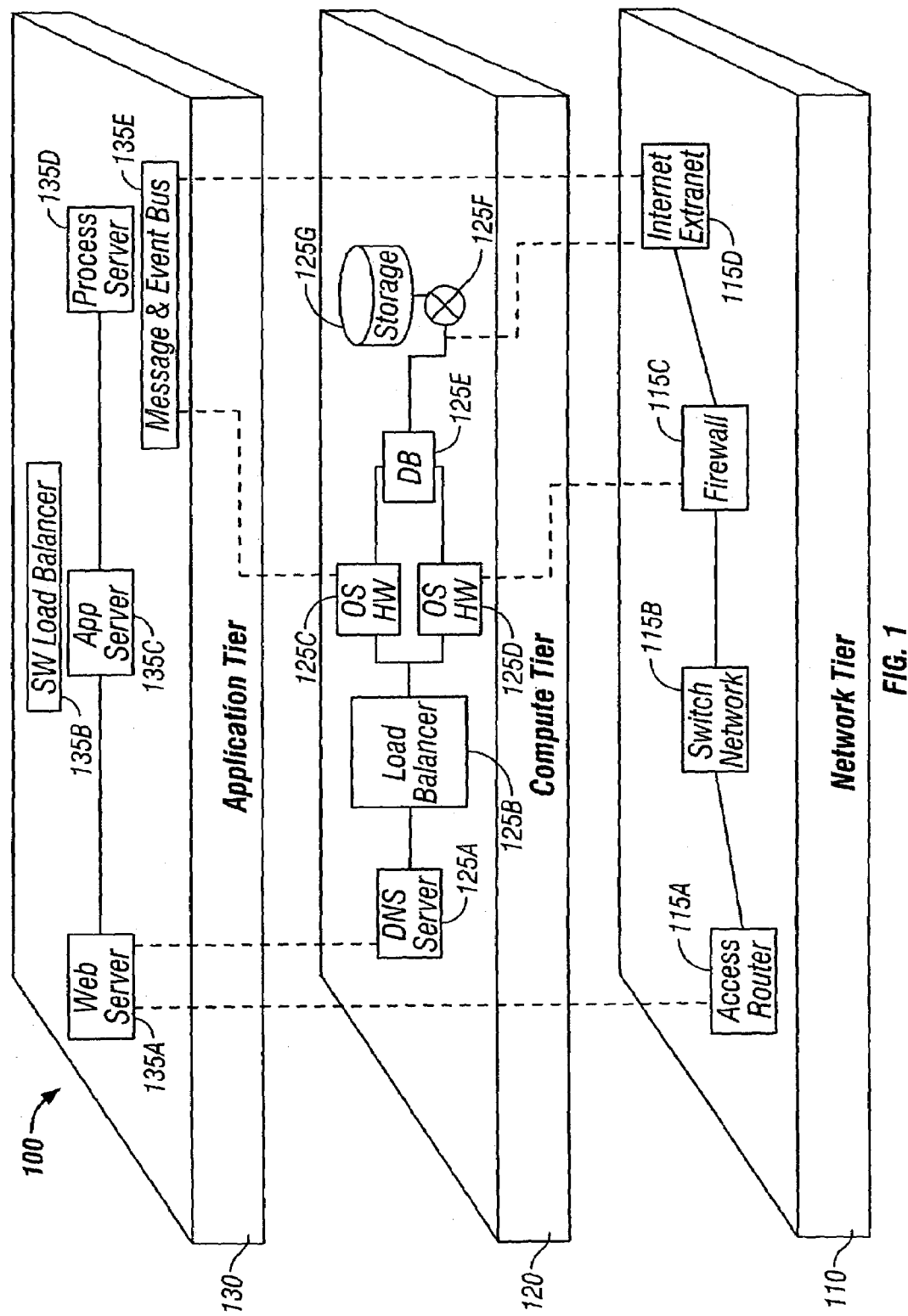
FIG. 1 is a representation of a multitier compute infrastructure.

FIG. 1 is a representation of an example multitier compute infrastructure 100. The infrastructure 100 includes multiple tiers 110, 120, 130 of components 115, 125, 135, which are interconnected to provide overall functionality. Generally speaking, the different tiers function at different "levels" and preferably function somewhat independently of each other. In one approach, each tier performs certain functions and there is a standardized interface between the tiers. The "interface" between the tiers may actually consist of a collection of standardized interfaces between individual components. In this way, individual tiers/components can be modified without affecting the other tiers/components so long as the interfaces are maintained. This provides flexibility and modularity. It also allows each tier to be optimized for its specific tasks. However, as a result of this, the tiers and the components can also be vastly different.

In the example shown in FIG. 1, the multitier compute infrastructure 100 includes three tiers: a network tier 110, a compute tier 120 and an application tier 130. This type of infrastructure is a common one for implementing enterprise applications.

The network tier 110 generally includes items that concern network communications. In a typical Internet case, it might include the access and IP network, and network components hosted or implemented on these networks, such as switches, routers, load balancers, firewalls, virtual LANs (VLANs), virtual private networks (VPNs) and layer 4–7 software switches and routers. Example vendors include Cisco, Unisphere, Redback and Netscreen.

The compute tier 120 generally includes items that provide underlying system functionality that may be used by many end user applications. Typical technology areas include computing, storage and infrastructure services. Examples of components in the compute tier 120 include host hardware such as desktop computers, servers and processors (e.g., Sun, Intel, HP, IBM), operating systems (e.g., Solaris, Linux, NT, HP-UX, AIX), and storage devices including RAID arrays, disk farms, storage area networks and the like (e.g., EMC, Brocade). System services, such as DNS, LDAP and NFS, are also classified as part of the compute tier 120 in this example.

The application tier 130 generally includes higher-level software that is more directed to providing end user or enterprise functionality, as opposed to system services for example. Example components include web servers (e.g., Apache™, iPlanet™, IIS), J2EE™ servers, application servers (e.g., WebLogic™, WebSphere®, iplanet™, ATG®, COM+), process flow servers, messaging services (e.g., Vitria®, WebMethods®, IBM MQ Series®), packaged applications (e.g., PeopleSoft®, Seibel®), legacy software, and database software (e.g., Oracle®). (WEBLOGIC is a trademark of BEA Systems, Inc.; WEBSPHERE and MOSERIES are registered trademarks of International Business Machines, Corp.; IPLANET is a trademark of Sun Microsystems, Inc.; ATG is a registered trademark of Art Technology Group, Inc.; Vitria is a registered trademark of Vitria Technology Inc.; webMethods is a registered trademark of webMethods, Inc. and PeopleSoft, Siebel, and Oracle are registered trademarks of Oracle Corporation, Apache is a trademark of The Apache Software Foundation:)

The division of an infrastructure into tiers and the definition of each tier are not unique. The division shown in FIG. 1 is merely an example. The infrastructure 100 in FIG. 1 could be divided into tiers other than the network, compute and application tiers. For example, instead of a compute tier, the infrastructure could be divided into a storage tier and a host tier. As another example, the network tier could be subdivided into access networks, LANs and WANs. As another example, applications can also be described using multiple tiers: a division into web servers, application servers and databases is one common way to describe a multitier application. Furthermore, given the three tiers shown in FIG. 1, the components can be categorized differently. For example, the system services could be classified as part of the application tier rather than the compute tier; or load balancers could be classified as part of the compute tier rather than the network tier; or database software could be classified as part of the compute tier rather than the application tier. The granularity of the components is also not unique and components can be formed from collections of other components. For example, a server can be further broken down into different physical parts, each of which is considered a component in its own right. Or enterprise software can be broken down into its constituent software modules, each of which is considered a component in its own right. Or a cluster of servers, each of which is a component, can itself be treated as a single component.

In addition, the names given to the tiers are not meant to imply a strict division of functionality. For example, all of the network functionality in the infrastructure is not required to reside in the network tier. Load balancing has some network aspects to it, but in one implementation, hardware load balancers are part of the compute tier and software load balancers are part of the application tier. Nor is there necessarily a strict division of software and hardware. Software and hardware can reside in any of the three tiers, depending on the definitions chosen for each tier.

Figure 2:
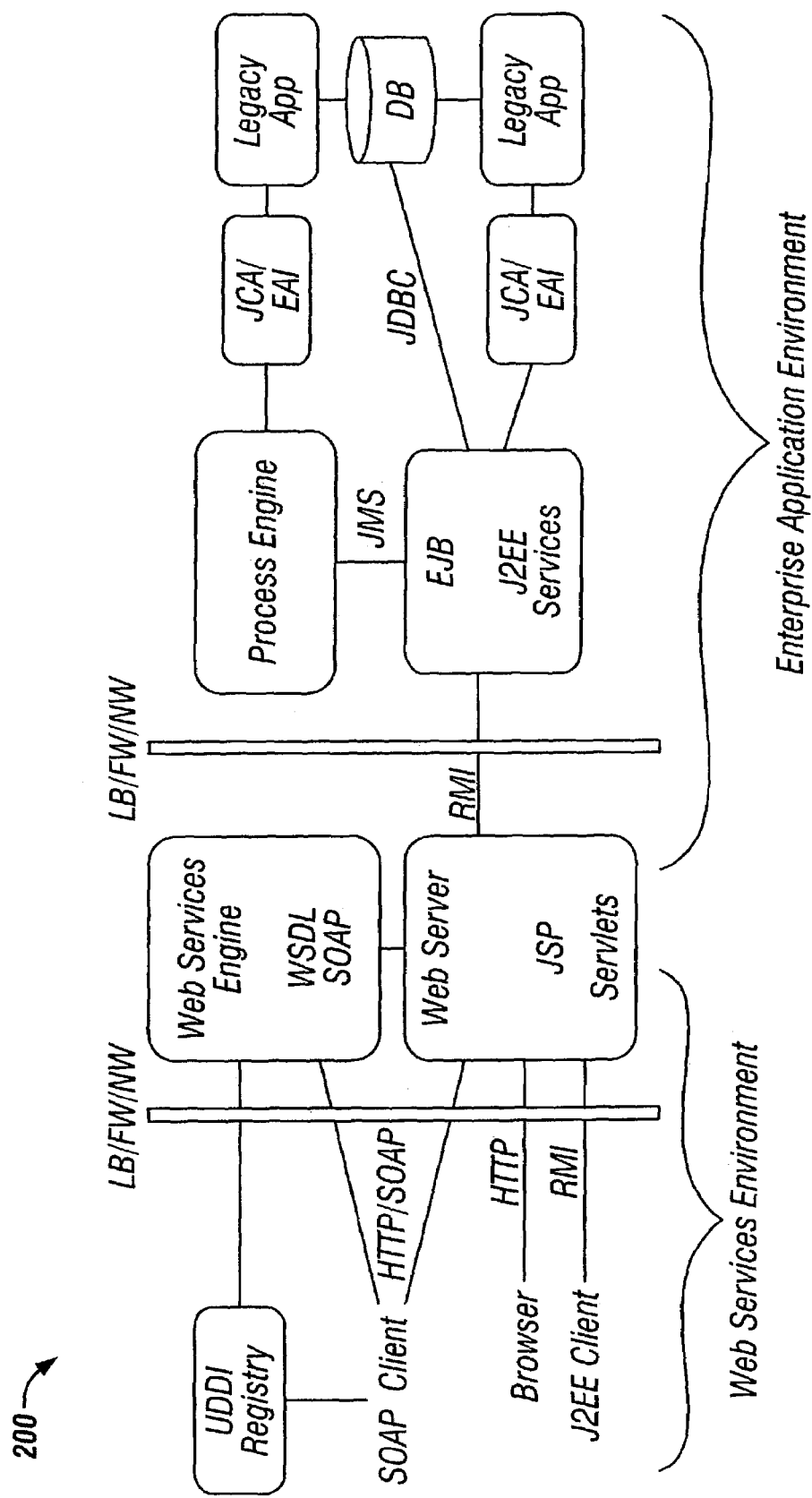
FIG. 2 is a representation of another multitier compute infrastructure.

FIG. 2 is another example of a multitier compute infrastructure 200. In this case, a web service is offered to end users over the Internet. The actual web service (e.g., booking a hotel room) can be fulfilled by many different entities over the Internet. The UDDI (Universal Discovery, Description and Integration) registry maintains a registry of handles for entities that offer the service. The SOAP (Simple Object Access Protocol) protocol provides a standardized interface for accessing the service over the Internet. The SOAP protocol uses HTTP as the transport mechanism. The remainder of the enterprise application is implemented by a three-tier architecture similar to that described in FIG. 1, possibly including web servers, business logic application servers, workflow engines and database servers. Some of the enterprise functionality is implemented using the J2EE™ software component architecture. Different portions of the enterprise application are separated by firewalls (FW) and are independently load balanced by either hardware or software load balancers (LB). IP connectivity is provided by a network connectivity component (NW). Database redundancy is achieved using parallel servers situated at multiple sites that are synchronized with each other. The components are connected by a network that typically is either a LAN or a MAN (Metropolitan Area Network). The "enterprise" in this example is not limited to the boundaries of a business' internal network but extends to include parts of the Internet (e.g., for the UDDI and SOAP portions of the enterprise application). The Internet is used as a WAN.

Despite differences between the web services example in FIG. 2 and the enterprise application example in FIG. 1, both are examples of a multitier compute infrastructure that can benefit from the deployment approaches described below. Even though the web services reach outside a corporation's network boundary onto the Internet, it can still be managed and modeled as a multitier compute infrastructure. In one approach, a fourth Internet tier is added to the three-tier compute infrastructure and high-level functionality such as the UDDI registry and SOAP applications reside in the Internet tier. Lower level aspects of the Internet, such as network connectivity (to the extent it is known), reside in the lower three tiers: application, compute and network. In an alternate implementation, the application tier is extended to include higher-level Internet functionality.

FIGS. 1 and 2 illustrate two examples of multitier compute infrastructures. Other examples will be apparent. In general, applications that are implemented using a multitier, component approach are especially likely to benefit from use of the deployment approaches described below. This is because the component aspect of the architecture likely will lead to a large number of components to be managed; and the multitier aspect likely will lead to cross-tier relationships between components, as well as complicating the management of individual components since management of the components requires knowledge about different tiers. As a result, a deployment approach that takes advantage of information about the different components and their relationships would be especially useful in this case. This is especially true since currently available deployment tools are generally deficient in this area.

Although deployment of distributed applications in a multitier compute infrastructure is somewhat more complex, the distributed multitier approach has numerous advantages that make it an attractive option. The division of the infrastructure into multiple tiers and into components, particularly if they are somewhat independent of each other, generally leads to increased flexibility and modularity. It also allows components to be specialized for particular tasks, thus increasing efficiency. This, in turn, can lead to lower cost as individual components are optimized and as they are shared among multiple applications or business services. It can also lead to faster development cycles as components are improved on an individual basis rather than requiring system-wide improvements, and to increased scalability as capacity can be incrementally increased by incrementally adding more components.

Figure 3:
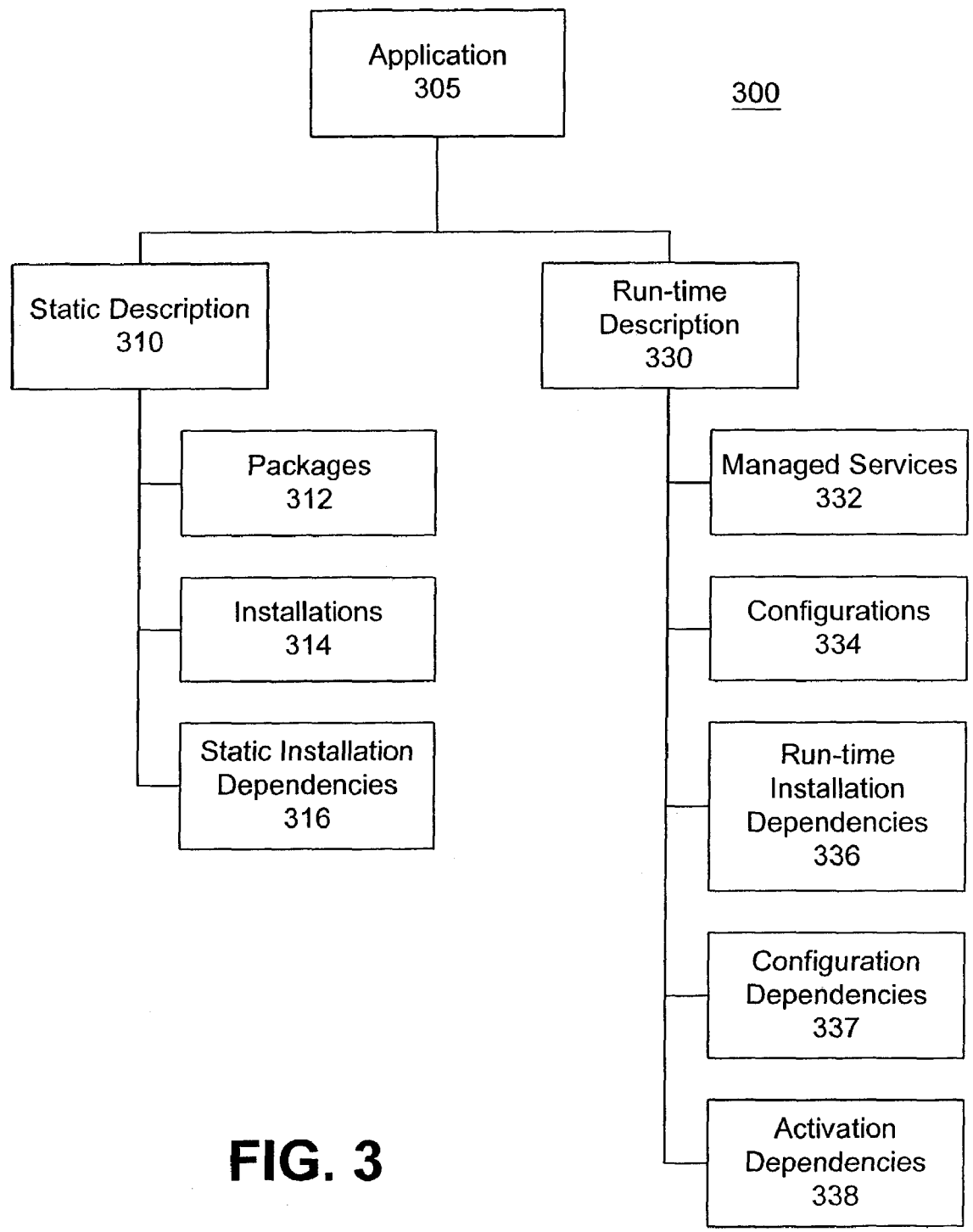
FIG. 3 is one implementation of a data hierarchy for an application model.

FIG. 3 illustrates one example of an application model 300 that can be used to streamline the deployment of an application 305. At a general level, an application model describes information used to deploy the application. For example, an application model can include some or all of the following: the software files that contain the application (which shall be referred to as "packages"); the hardware locations where the software files are to be physically installed; configuration information for the application; dependencies of the application on other applications, hardware devices or other information (e.g., configuration information) and/or instructions for installation, configuration and activation.

Use of an application model has many benefits. For example, the model can be used to automate the process of deploying applications or updates, thus reducing the time and error in these processes. This can also reduce the IT head count needed to support the application. The model also documents the topology and deployment process for the application, possibly also providing visibility into cross-tier interactions and relationships. This can lead to a better understanding of the relationships between the application and different parts of the multitier compute infrastructure, possibly leading to further optimization of one or both.

In FIG. 3, the model 300 of application 305 is divided into a static description 310 and a run-time description 330. The static object 310 describes the application 305 from a more static point of view. For example, it generally includes information such as the files to be installed, where the files are to be installed, how they are to be installed, etc. In contrast, the run-time object 330 is a more dynamic view of the application 305. It generally includes information such as the run-time components (which shall be referred to as managed services), and their configurations and dependencies. The term "object" is used throughout in its general sense and does not imply implementation using object-oriented programming. In this example, the application 305 is to be deployed in the multitier compute infrastructure of FIG. 1.

In the example of FIG. 3, the static description 310 includes three subclasses: packages 312, installations 314 and static installation dependencies 316. Packages 312 are the actual files/images that contain the application 305. These files typically are physically uploaded to different hardware devices during installation. Examples include executables to be installed and run on different servers, as well as client files to be distributed. Packages 312 can be stored in ready-to-execute form or some other form. Common formats include .tar, .jar, .zip, .bin, .rpm and .war files. Packages 312 can also include source code, for example to be compiled as part of the installation process or to be run in an interpreted mode. The package objects 312 can also include additional information related to the packages, such as the location of the master image for the package or the version of the package.

Installation instructions 314 typically identify where the packages 312 are to be installed. Note that there can be more than one installation for a given package. For example, if a .tar file is to be installed on five different physical servers as part of a deployment, the installation objects 314 typically would include the addresses of the servers and the installation directory on each server.

The installation objects 314 usually also describe what steps, if any, are to be taken to complete physical installation of the packages 312. These typically include unpack instructions. For a .tar file, the unpack instructions can include instructions to untar the file. For source code, it can include a make file describing the compile and linking process for the source code. For a Java jar file, the unpack instructions are defined by the Java standard. In one approach, the default unpack instruction is based on the package format. For example, "tar xf XXX.tar" can be the default unpack instruction for file XXX.tar. The installation objects 314 can also include installation commands that are executed in a specified sequence after the package has been unpacked. Uninstall commands can also be included, in anticipation of a later uninstall of the package.

Static installation dependencies 316 describe the dependency of a package or installation on some other component (including both other installations in this application and installations from other applications) for purposes of installation. For example, installation of a WebLogic application server on a specific hardware server might depend on the existence of a particular version of JDK also being installed on that hardware server, or on a certain patch level for the operating system on the hardware server, or on the existence of certain hardware boards within the server. These are examples of static installation dependencies 316.

Returning to the example of FIG. 3, the run-time description 330 includes the following subclasses: managed services 332, configurations 334, run-time installation dependencies 336, configuration dependencies 337 and activation dependencies 338. Managed services 332 are the run time components of the application 305. Examples include executable processes and scripts or similar elements. There may or may not be a one to one correspondence between managed services 332 and packages 312. For example, a package 312 might include many components, which make up several different managed services 332. Alternately, a managed service 332 might draw on components from several different packages 312.

The configuration objects 334 provide additional information on individual instances of the managed services 332, for example where the managed services are to execute (which should be consistent with where the packages 312 are installed) and how to configure the underlying installations. There can be more than one instance of any given managed service 332. The configuration objects 334 can also include information such as number of threads, memory allocation, number of ports and pool size.

The run-time object 330 includes three types of dependencies 336–338 in this example. In general, dependencies describe relationships between two items. Other application models can include different types or numbers of dependencies. In this example, run-time installation dependencies 336 define which packages/installations must be available in order for a managed service to function properly. For example, if a managed service 332 draws on components from three different packages 312, those packages would have to be installed in order for the managed service to function properly.

Configuration dependencies 337 describe situations in which the proper configuration of a managed service 332 depends on some other service. For example, one managed service might call on another managed service in the application. Alternately, a managed service might depend on the availability of infrastructure services, such as a DNS server or NFS server. The dependence on infrastructure services will sometimes be referred to as service dependencies.

Activation dependencies 338 indicate the order in which services that form the application should be started or shut down. In other words, an activation dependency indicates that some other service should be activated before the managed service 332 can be activated. It can also describe the delay required between the activation of the various services.

The application model in FIG. 3 is application-centric in the sense that most (but not necessarily all) of the description is centered at the application level as opposed to the network or compute levels. This is not required. For example, other application models can explicitly include significant amounts of information about the network or compute levels (e.g., configuration information for the underlying hardware or dependencies on specialty hardware). Alternately, if a topology map of the multitier compute infrastructure is available, information about the network and compute tiers can be automatically imported or referenced by the application model. For further description of topology maps, see U.S. patent application Ser. No. 10/365,185, "Topology Mapping of a Multitier Compute Infrastructure," by Or et al., filed Feb. 11, 2003, which is incorporated by reference.

In addition, note that the term "application" is not meant to imply a certain level of granularity. The following examples are based on the J2EE™ software component architecture and define packages, installations, managed services, configurations, etc. in a manner consistent with this architecture. However, the approach is not limited to this architecture or the level of granularity shown. What are considered to be components of a package or managed service in the following examples may be the entire package or managed service in a different implementation, or vice versa.

Furthermore, the example of FIG. 3 explains certain concepts and relationships, but the implementation of these concepts and relationships that may or may not follow the hierarchy shown in FIG. 3. For example, FIGS. 4A–4C illustrate an implementation which contains the information shown in FIG. 3 but does not have the tree hierarchy shown in FIG. 3.

In FIG. 4C, an application "Order Management System—Production" 490 is used to manage orders placed over the Internet. FIG. 4C shows a summary of the application after it is deployed. ManagedServices 491 shows that the application is implemented as four instances of three managed services: the ApacheServer "portal" running on 10.10.10.1:80, the WebLogic Server "orderserver" running on 10.10.10.2:7001 and on 10.10.10.2:7002, and the OracleInstance "ordb" running on 10.10.10.4:1521. The managed service portal implements the customer interface, orderserver implements the business logic for ordering, and ordb is the back-end interface to the company's ordering database (e.g., pricing, availability of items, etc.). Packages 493 and SoftwareComponents 495 list the corresponding packages and EJBs used to implement the managed services 491.

The application model for the application "Order Management System—Production" 490 is shown in FIGS. 4A–4B. In this example, the application model is divided into the two main categories of definition 450 (shown in FIG. 4A) and configuration 470 (shown in FIG. 4B), as opposed to the static description 310 and run-time description 330 as shown in FIG. 3. The application model in FIG. 4 still contains a static description 310 and run-time description 330 of the application, as well as the other objects shown in FIG. 3, but this information is not organized according to the hierarchy shown in FIG. 3.

The definition object 450 describes the application from a more generic point of view, defining the application in terms that are independent of actual instances of the application. The configuration object 470 describes a particular instance of the application, in this case the instanced summarized in FIG. 4C. This approach is useful because the definition object 450 can be reused if the application is to be implemented more than once. For example, in FIGS. 4A–4B, the definition object 450 is called "Order Management System" 451 and the specific instance of the application is "Order Management System—Production Config" 471, which is to be used for production purposes. Another instance "Order Management System—Development" could be created for use by the development department. Alternately, different instances "Order Management System—N. America", "Order Management System—Europe" and "Order Management System—Asia" could serve different geographic regions. Each of these instances can be based on the same definition 450.

Returning to FIG. 4A, PackageDef 455 identifies the packages 457 and their static installation dependencies 459. These correspond to the packages 312 and static installation dependencies 316 in FIG. 3, respectively. The application is based on five packages 457: portal.war, ordertracking.jar, shoppingcart.jar, schema.tar and common.jar. SoftwareComponentDef 460 further defines the packages. In this case, the application is based on the J2EE software component architecture. Each of portal.war, ordertracking.jar and shoppingcart.jar includes Java servlets or Enterprise Java Beans™ (EJB™s), as defined in 460. Specifically, portal.war includes LoginServlet, OrderEntryServlet and OrderStatusServlet; ordertracking.jar includes OrderTrackerEJB and shoppingcart.jar includes ShoppingCartEJB. The package common.jar includes common components used by portal.war, ordertracking.jar and shoppingcart.jar. Accordingly, these other packages have static installation dependencies 459 on common/jar. The package schema.tar contains the schema used to interface to an Oracle database.

ManagedServicesDef 465 identifies the run-time components of the application, which corresponds to the managed services 332 of FIG. 3. There are three managed services 466: portal, orderserver and orderdb. Their run-time installation, configuration and activation dependencies are shown in columns 467, 468 and 469, respectively, and correspond to the run-time installation, configuration and activation dependencies 336, 337 and 338 of FIG. 3. The run-time installation dependencies 467 are that the managed service portal depends on the packages portal.war and common.jar; orderserver depends on ordertracking.jar, shoppingcart.jar and common.jar; and orderdb depends on schema.tar.

The only configuration dependency 468 is that orderdb depends on orderserver. In other words, orderdb cannot be configured properly unless the orderserver is configured. Service dependencies are not shown for clarity. For activation dependencies 469, portal must be activated after orderserver, which must be activated after orderdb.

In FIG. 4B, the configuration object 470 includes instance-specific information. PackageConfig 475 and SoftwareComponentConfig 480 together contain information that corresponds roughly to installations 314 and configurations 314 of FIG. 3. Column 476 identifies the four instances of the three managed services and their target hardware devices. Column 477 gives installation information, corresponding to installations 314 of FIG. 3. For example, one instance of orderserver is to be implemented on 10.10.10.2 by installing ordertracking.jar and shoppingcart.jar at /opt/wls7.0/deploy/applications, and common.jar at /opt/wls7.0/deploy/lib. The other instance of orderserver is to be implemented on 10.10.10.3 in the same directory locations. Unpack instructions are not explicitly included. Rather, files are unpacked according to default instructions. Configuration information (including listening port, memory allocation, whether clustering is enabled, and script instructions) is contained in column 478. Column 483 of SoftwareComponentConfig 480 provides additional configuration information concerning pool size for the EJB instances 481.

FIGS. 3–4 are merely examples of application models. Other models will be apparent. Referring to FIG. 3, there are other ways to organize an application model. For example, the application can also be modeled as a monolithic object that contains the description of all the parameters required to deploy the application.

FIG. 4 is also just an example implementation. Other implementations will be apparent. For example, the information contained in the application model of FIGS. 4A–4B can be represented in a number of ways. It can be explicitly defined. For example, column 477 under PackageConfig 475 could explicitly state that portal.war is to be installed at 10.10.10.1/opt/wls7.0/deploy/applications. It can be implied or inherited. For example, column 476 could state that one instance of the managed service portal is to execute on 10.10.10.1, column 467 that portal depends on portal.war, PackageDef 455 that portal.war is to always be installed at opt/wls7.0/deploy/applications, and therefore by implication portal.war should be installed at 10.10.10.1/opt/wls7.0/deploy/applications.

As another example, the information can be divided in different ways between generic or meta-descriptions (i.e., descriptions that are not instance-specific) and instance-specific descriptions. As one example, the unpack instruction for portal.war can be included in column 477 under PackageConfig 475 as part of the instance-specific installation information. Alternately, it could be included as part of PackageDef 455 and apply to all installations of portal.war. In the actual example, a default unpack instruction is used so no unpack instruction is explicitly included in the application model at all.

The classes and objects in FIG. 4 can also be defined differently, given different names, and arranged differently with respect to each other. For example, in an alternate approach, the information is captured in a property file as opposed to a model and the file can be read at deployment time. Other approaches and combinations of approaches will be apparent.

Figure 5:
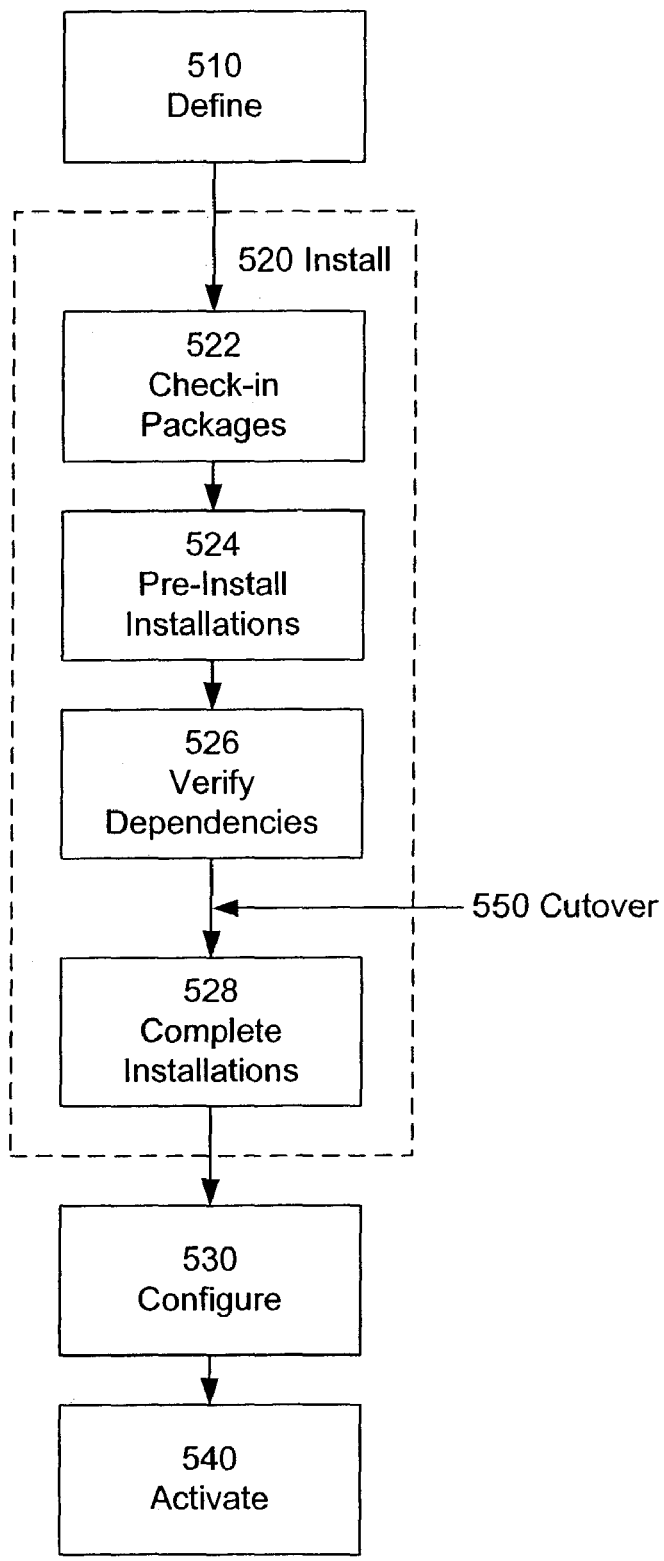
FIG. 5 is a flow diagram illustrating initial deployment of an application.

FIG. 5 is a flow diagram illustrating initial deployment of an application. This example will be illustrated using the application model of FIG. 4, although the method is not limited to this type of application model. Deployment 500 includes the following phases: definition 510 of the deployment, installation 520 of packages, configuration 530 of the installed packages, and activation 540 of the configured installations. In the specific embodiment of FIG. 5, installation 520 is divided into two phases: steps that occur before cutover 550 (including pre-installation 524) and those which occur after cutover 550 (including completion 528 of installation). Cutover 550 is the process of transitioning the application or infrastructure from one design and deployment to another design and deployment, typically in order to provide changed or added functionality.

The phases and/or steps are executed according to information determined from the application model. For example, if the application model includes a static description and a run-time description, installation 520 can proceed according to the static description. Configuration 530 and activation 540 can proceed according to the run-time description. Furthermore, dependencies that affect a phase (or steps within a phase) can be verified before the phase (or step) is executed. Alternately, the dependency can affect the order of execution of the phase (or step).

In step 510, the deployment task can be defined in a number of ways. In one approach, an application model, such as shown in FIGS. 4A–4B, defines the deployment. The application models can also be created in a number of different ways. In one approach, the model is created manually. For example, an individual could simply input all of the information shown in FIGS. 4A–4B. In this approach, the definition step 510 is not automated but other phases of deployment can be automated once the application model is available. Tools can be used to streamline the process of manual input. For example, see U.S. patent application Ser. No. 10/366,817, "Business Service for a Multitier Compute Infrastructure," by Joshi et al., filed Feb. 12, 2003, which is incorporated by reference.

In alternate approaches, some or all of the application model can be created automatically. In one approach, software developers document the relationships as they develop the application and this can serve as the basis for some or all of the application model. For example, see U.S. patent application Ser. No. 10/366,958, "Service Description for a Multitier Compute Infrastructure," by Joshi et al., filed Feb. 12, 2003, which is incorporated by reference. In another approach, a map of the current topology of the multitier compute infrastructure is automatically discovered. For example, see U.S. patent application Ser. No. 10/365,185, "Topology Mapping of a Multitier Compute Infrastructure," by Or et al., filed Feb. 11, 2003, which is incorporated by reference. This topology map can serve as the basis for some or all of the application model. In one variant, the topology map includes not only the current topology of the multitier compute infrastructure but also the deployment information in the application model. In other words, the current topology and the application model are combined into a single topology map. In a preferred embodiment, the topology map extends the Distributed Management Task Force's (DMTF) Common Interface Model (CIM), the map is hierarchical, the root is the CIM core, and the different categories are either CIM categories if they are available or CIM extensions if they are not.

Installation 520 refers to distributing and installing the packages on their target devices (i.e., their hardware destinations). Client files, if any, can also be distributed. In FIG. 4, installation 520 includes installing the packages, as defined in column 457, according to the installation instructions in columns 476 and 477. Package common.jar is installed at /opt/wls7.0/deploy/lib on machines 10.10.10.1, 10.10.10.2 and 10.10.10.3, and so on for the other packages.

FIG. 5 shows details of a specific approach to installation 520. In this approach, there is check-in 522 of packages. Check-in collects the packages at a central location (or set of locations) and can also implement version control of the packages. This way, the system can keep track of which packages are the most recent versions. It can also track which versions have been distributed to target devices and whether they require updating. For FIG. 4, the most current versions of the packages 457 are checked-in.

Checked-in packages are pre-installed 524, meaning that they are physically distributed but not to their final destinations. They may be installed at temporary directories on the target devices and later moved to the final destinations to complete the installation. Alternately, pointers can be redirected to the temporary location, thus effectively making it the final destination. Pre-installation 524 reduces the number of tasks that are performed after cutover 550, thus reducing the disruption to the multitier compute infrastructure. It also makes the post-cutover tasks more local to the target device, thus reducing any risk or complexity associated with physically distributing files over a network. If all packages have been pre-installed 524, then no packages will need to be physically distributed to target devices post-cutover. For FIG. 4, packages are distributed and pre-installed on machines according to columns 476 and 477. For example, portal.war is distributed to 10.10.10.1 and installed at a temporary location (not shown in FIG. 4).

If a package changes after it has been checked-in, the deployment process can be updated. The new version of the package is checked-in 522. If the old version has already been distributed, then the new version is distributed to replace the old version. This can occur automatically if the system tracks versions for the packages and also tracks which versions have been pre-installed. For example, if a new version portal.war is checked-in, the system can automatically distribute it to 10.10.10.1.

Before initiating cutover 550, dependencies 459 and 467 are verified 526. If required packages or services are missing, the system can send notification of the problem or even automatically correct the problem. The system can also perform other pre-cutover checks. For example, column 457 can be used to verify that all packages have been checked-in 522. Columns 466, 467, 476 and 477 can be used to verify that all packages have been properly versioned and pre-installed 524, where applicable. The system can also check that all target devices are reachable. For example, if the system determines that common.jar is not pre-installed on 10.10.10.1 or that an old version is pre-installed or that target device 10.10.10.1 is not reachable, then it can flag or correct this problem.

Once pre-cutover verifications are completed, cutover 550 is initiated and installation is completed 528. In FIG. 4, the pre-installed packages are moved from their temporary locations to their final destinations, as defined in column 477. Packages that were not pre-installed are also installed at this time.

Installed packages are configured 530 to generate the managed services. This can include setting parameters for the application, compute and/or network tiers, for example pointing to the right database and web servers, pointing the application to the right DNS servers and/or loading the right schemas into the database. In FIG. 4, configuration information is listed in columns 468, 478 and 483. Configuration information can also be used to determine an order for configuration.

In one approach, managed services are modeled based on software containers and process pools. The software container defines the structure of the managed service (or components of the service). For example, a Unix process is a generic container for running an executable in a Unix operating system and serves as the default container. EJB containers, CORBA servers and web servers are examples of specific containers that can run within a Unix process. The process pool structure includes processes that run the application logic. In FIG. 4A, the servlets in portal.war run inside a web server the EJBs 481 run inside an EJB container. Configurations 483 define the process pool size for the EJBs 481. Configuration 530 includes configuring the software containers and SoftwareComponents (EJBs in this example).

After configuring the installations, the managed services are activated 540, preferably in the order specified by the activation dependencies 469. This involves starting up the processes and possibly also the monitoring agents used to manage the application from this point onwards. Activation activities can include initiating the correct sequence for starting servers in the application and compute tiers; pushing routes, DNS names and network services to the requisite devices; publishing URLs; and starting clusters and managed services. Activation 540 can also include running scripts, which can be particularly useful to activate legacy software. After activation 540, the deployment can be verified to confirm that it has been properly performed. In FIG. 4, the activation dependencies 469 dictate that orderdb is activated first, followed by orderserver and then portal.

Figure 6:
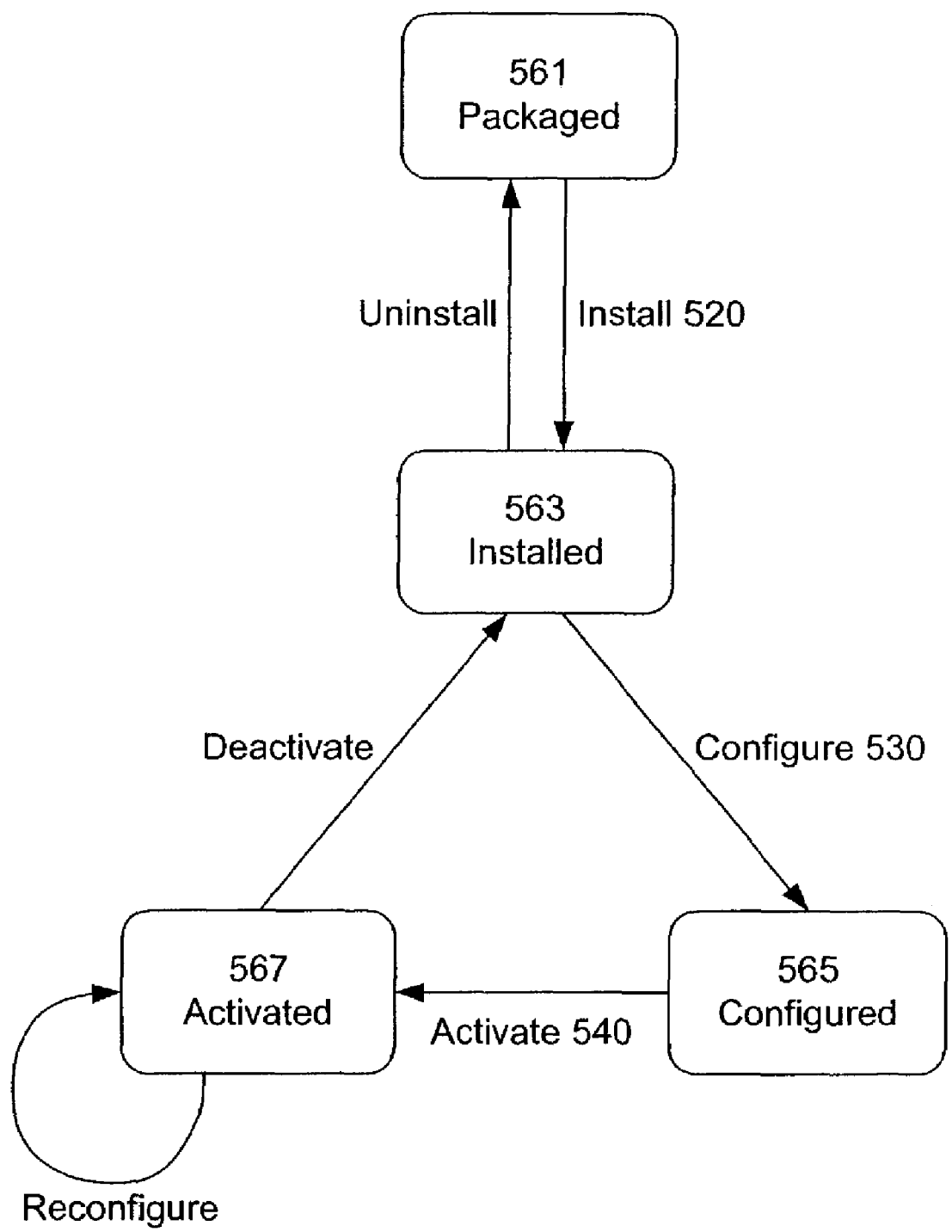
FIG. 6 is a state diagram for deployment.

FIG. 6 is a state diagram describing the method shown in FIG. 5. There are four states for an application (or for components within the application): Packaged 561, Installed 563, Configured 565 and Activated 567. These correspond to the processes described in FIG. 5. Initially, the application begins as a group of packages. It is in the Packaged state 561. After the packages are installed 520 on the target devices, its state changes to Installed 563. Configuring 530 the installations changes the state to Configured 565. Activating 540 the configurations changes the state to Activated 567. Once an application is Activated 567, monitoring the application does not change the state of the application. In the reverse direction, deactivation usually changes the state from Activated 567 to Installed 563 (or perhaps to Configured 565). Uninstall changes the state to Packaged 561.

State monitoring of the application can be important in the context of sequencing the overall deployment. As an application passes through each of its states, other components of the multitier compute infrastructure can also be configured based on the application's state. Proper management of these relationships can reduce the risk of a failed deployment.

Other tools can also be used to manage deployment. Some examples include change management tools and version control for the deployed application, as well as audit trails of the deployment process. For some deployments, it can be difficult to track the dependencies on, for example, the operating system version and patch levels, versions of third party software, and/or configurations of the application entities themselves like DB connections, thread counts and other parameters. As a result, it can be useful to implement version control for the deployed application.

The version for a deployment depends on the packages used (and the version of each package) and the configurations used. In one approach, a change in either the package or the configuration causes a change in the deployment version. So, for example, the following situations can change the deployment version:

Deployment ver 1.0={Package ver 1.0, Configuration ver 1.0}

Deployment ver 2.0={Package ver 1.0, Configuration ver 2.0}

Deployment ver 3.0={Package ver 2.0, Configuration ver 2.0}

Note that a simple installation without a corresponding reactivation of the application does not change the deployment version. Activations that include changes only to configurations will cause a change in the deployment version. The application can be rolled back to a previous deployment version provided that it does not cause a conflict in resources shared with other applications.

Figure 7:
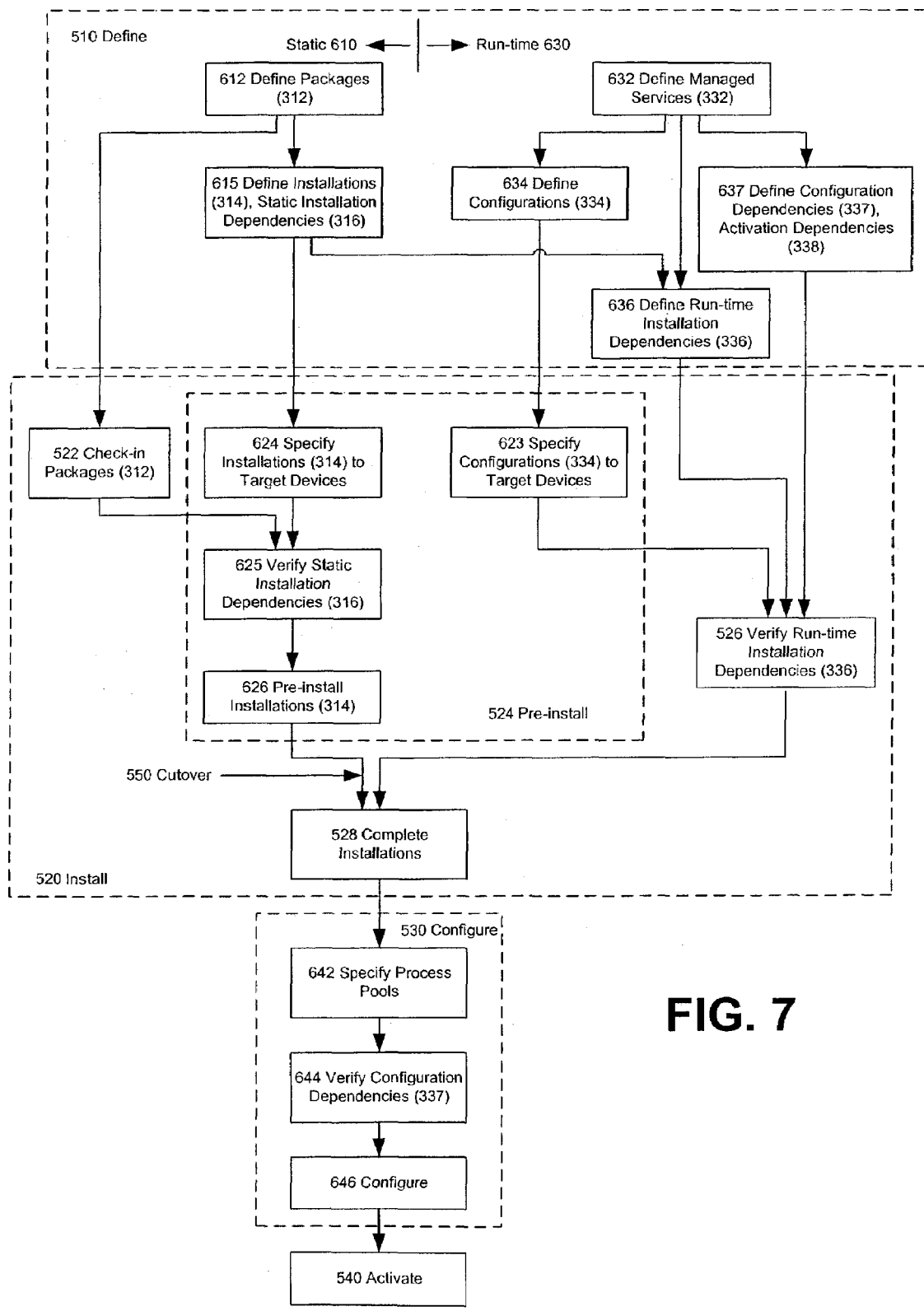
FIG. 7 is a flow diagram for initial deployment that combines the method shown in FIG. 5 with the application model of FIG. 3.

FIG. 7 is a flow diagram of one example that combines the method shown in FIG. 5 with the application models of FIGS. 3–4. The reference numbers in FIGS. 3 and 5 have been used in FIG. 7 to show the correspondence between the figures. In FIG. 7, the define step 510 is divided into two branches: define 610 the static description 310 of the application, and define 630 the run-time description 330 of the application. In the static branch 610, the packages 312 are defined in step 612. The remainder of the static description (including installations 314 and static installation dependencies 316) is defined in step 615. In the run-time branch 630, the managed services 332 and configurations 334 are defined in steps 632 and 634, respectively. Run-time installation dependencies 336 are defined in step 636, and configuration and activation dependencies 337,338 are defined in step 637.

The division of the definition process 510 into different steps 612–637 is primarily to show dependency of steps on one another. For example, the definition 636 of run-time installation dependencies is separated from the definition 637 of configuration and activation dependencies because step 636 depends on the prior definition of installations in step 615 whereas step 637 does not. The division is not meant to imply that steps 636 and 637 must occur separately or in separate pieces of software. Nor does it imply that the definition of configuration and activation dependencies must always occur together since these two are shown in a single step 637. As another example, the definition 612 of packages is separated from the definition 615 of installations and static installation dependencies because step 522, check-in of packages, depends on the prior definition of packages but not of installations or static installation dependencies.

In the installation step 520, the substeps of package check-in 522, pre-install 524, verify dependencies 526 and complete installation 528 are shown in FIG. 7. Pre-installation 524 is subdivided into further steps. In steps 623 and 624, the relevant run-time and static information is distributed to the target devices in preparation for deployment. This includes information about the installations and configurations destined for each target device. On the static side, pre-installation 524 also includes verifying 625 the static installation dependencies 316 before pre-installing 626 some or all of the installations 314. Some installations may not be pre-installed if, for example, the installation is already installed or it cannot be pre-installed. Run-time installation dependencies 336 for the managed services are also verified 526 before initiating cutover 550.

The configuration step 530 shown in FIG. 7 assumes that the managed services are modeled based on software containers and process pools. In step 642, information about the process pools is distributed to the target devices. In step 644, the configuration dependencies 337 are verified. Then, the application is configured 646, including configuration of the software containers, software components and the underlying system (e.g., infrastructure service and/or hardware). Configuration dependencies 337 can include information that affects the order of configuration 530. Activation 540 occurs in an order according to the activation dependencies 338.

Figure 8:
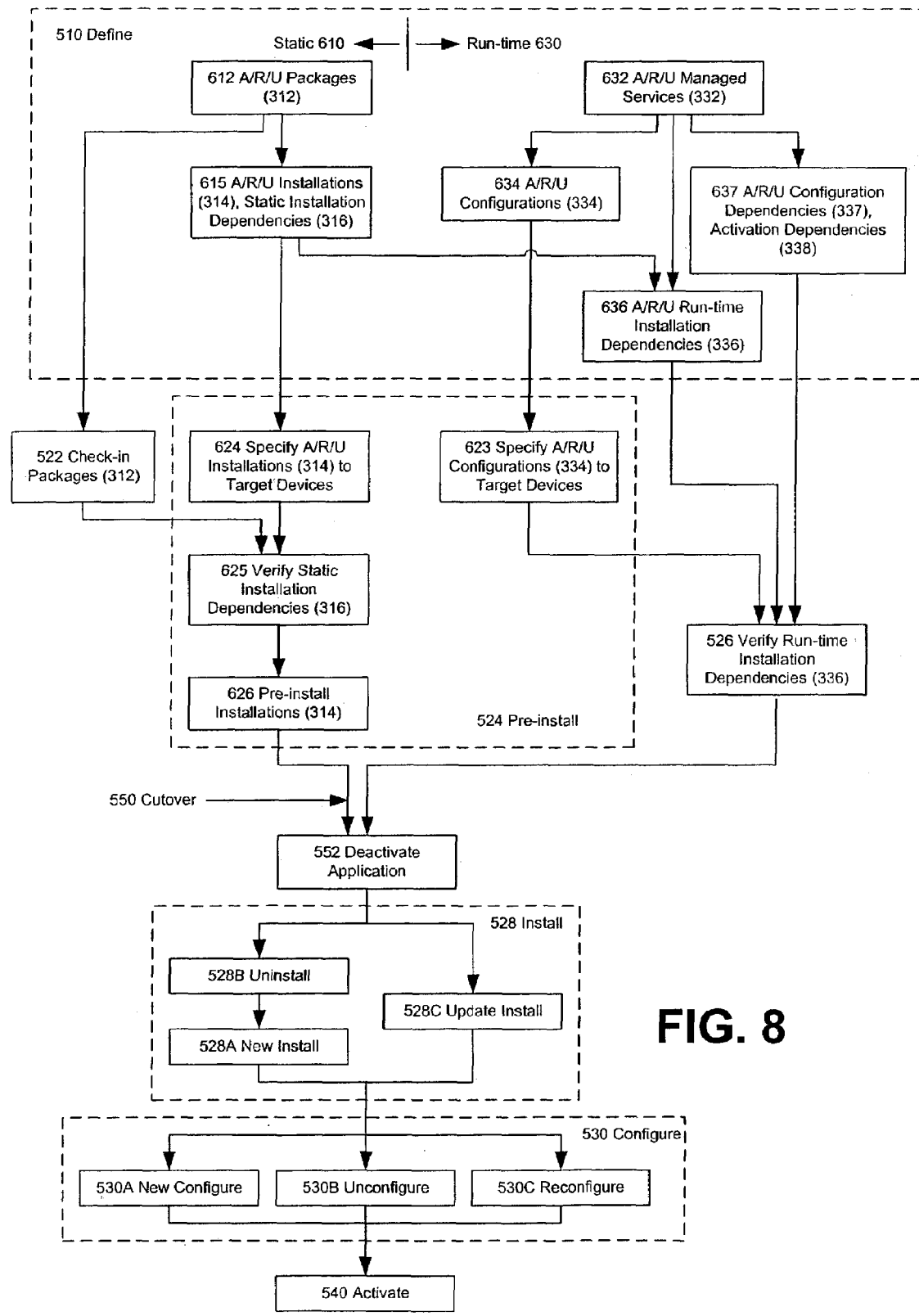
FIG. 8 is a flow diagram illustrating update of deployment of an application.

FIG. 8 is a flow diagram illustrating one method for updating an already deployed application. This method is based on the method shown in FIG. 7, but with the following difference. In initial deployment, there generally is no pre-existing application. The application is being deployed "from scratch," so to speak. In update deployment, there is an activated application that is to be updated. Some new portions may be added, some existing portions may be removed, and other existing portions may be retained but updated. As a result, the method in FIG. 8 is modified to handle these three cases. In FIG. 8, the steps are labeled with numbers that correspond to the steps in FIG. 7. This is to show correspondence. It does not mean that the steps are identical.

One difference can be seen in the steps 612, 615, 632, 634, 636 and 637 that define the application. In FIG. 7, these steps simply define the packages, managed services, installations, configurations, dependencies, etc. In FIG. 8, these steps define changes to the current packages, managed services, etc. In general, this is shown by the phrase "A/R/U," which is short for "Add/Remove/Update." For example, step 612 in FIG. 8 is labeled "A/R/U Packages" whereas it is "Define Packages" in FIG. 7. "A(dd)" refers to new packages to be installed, "R(emove)" refers to current packages to be uninstalled, and "U(pdate)" refers to current packages to be updated. "Define" is implied but not shown in FIG. 8 in order to save space in the figure.

Similarly, in steps 623 and 624, information about add/remove/update is distributed to the target devices. This can be broken into two substeps. In the first substep, the system generates lists for the separate cases of add, remove and update. In the case of packages and installations, these will be referred to as the "New", "Uninstall" and "Update" lists.

For managed services and configurations, they are the "New", "Unconfigure" and "Reconfigure" lists. These lists are part of the information that is distributed to the target devices in the second substep of steps 623 and 624.

Referring now to the remaining pre-cutover steps 522, 526, 625 and 626, these are generally the same in both figures, except that in FIG. 8 they apply primarily to new and possibly also updated items. In FIG. 8, after cutover is initiated 550, the current application is deactivated 552. Installation is completed in three steps 528A–C, one for each of add, remove and update, respectively. Configuration is also completed in three steps 530A–C, also corresponding to add, remove and update, respectively. The updated application is then activated 540.

FIGS. 5–8 are examples of deployment. Other variations will be apparent. For example, FIGS. 5–8 generally divide the deployment process into four phases. This is not required. The deployment process can be divided into phases other than the four shown or even implemented in a single process. As another example, not all of the phases shown are required. Different situations might require only installation 520, or only installation 520 and configuration 530, or only configuration 530 and activation 540, or only pre-installation 524. As another example, the goal of the process may not be the deployment of an application. Instead, it could be simply to add/remove/update configurations or to add/remove/update installations. Another example is to roll back the version of the deployment (i.e., change the application to a previous version if, for example, the current version was recently deployed and is not working properly). Roll back can be treated as a special case of update, in which the versions are replaced by earlier versions rather than later ones.

As another example, the steps in the process can be implemented differently or allocated differently between tools. Some of the steps may be performed manually— which ones will depend on the specific situation and the availability of tools. Tools can automate some or all of the steps. At one extreme, a single tool can implement the entire deployment process. At the other extreme, a different tool can be specialized for each step, resulting in a suite of tools to implement the entire process.

Figure 9:
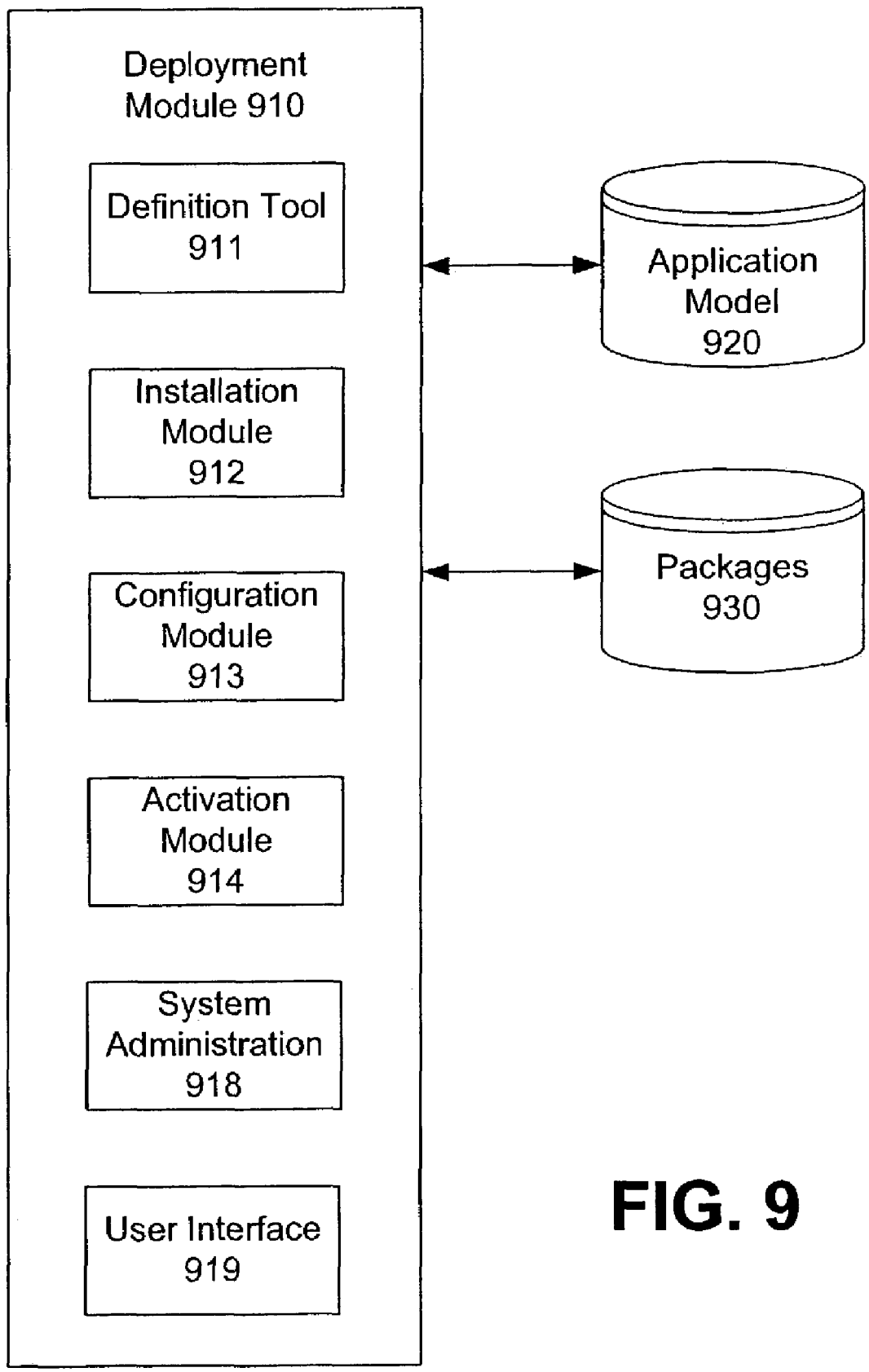
FIG. 9 is a block diagram of a computer apparatus that includes a deployment module.

FIG. 9 is a block diagram of a computer apparatus that includes a deployment module 910 for implementing the deployment process. The deployment module 910 can be used by human users and/or other software. Different deployment modules can implement different functionality, including some, all or none of the functionality described below. For convenience, the module will be referred to as a deployment module even if it does not implement an entire deployment process (e.g., only implements installation, or configuration and activation, etc.).

The example deployment module 910 shown in FIG. 9 includes a definition tool 911, an installation module 912, a configuration module 913, an activation module 914, system administration 918 and a user interface 919. The deployment module 910 can access the application model 920 and the checked-in packages 930.

The definition tool 911 assists the user in defining 510 the application model 920 and/or automates the definition process 510. One example is a text editor that implements rules or scripts to assist the user in entering the application model. Another example is a graphical interface that permits the user to define the application model by dragging and dropping icons, for example. Another example is a tool that reads in previously collected information and automatically constructs the application model.

The next three modules 912, 913 and 914 implement the functionality of the installation 520, configuration 530 and activation 540 steps, respectively. These modules execute their tasks according to information determined from the application model. For example, if the application model includes a static description and a run-time description of the application, the installation module 912 typically will execute according to the static description and the configuration 913 and activation 914 modules will execute according to the run-time description. System administration 918 performs general housekeeping tasks. The user interface 919, graphical or otherwise, provides a user interface for humans.

Figure 10:
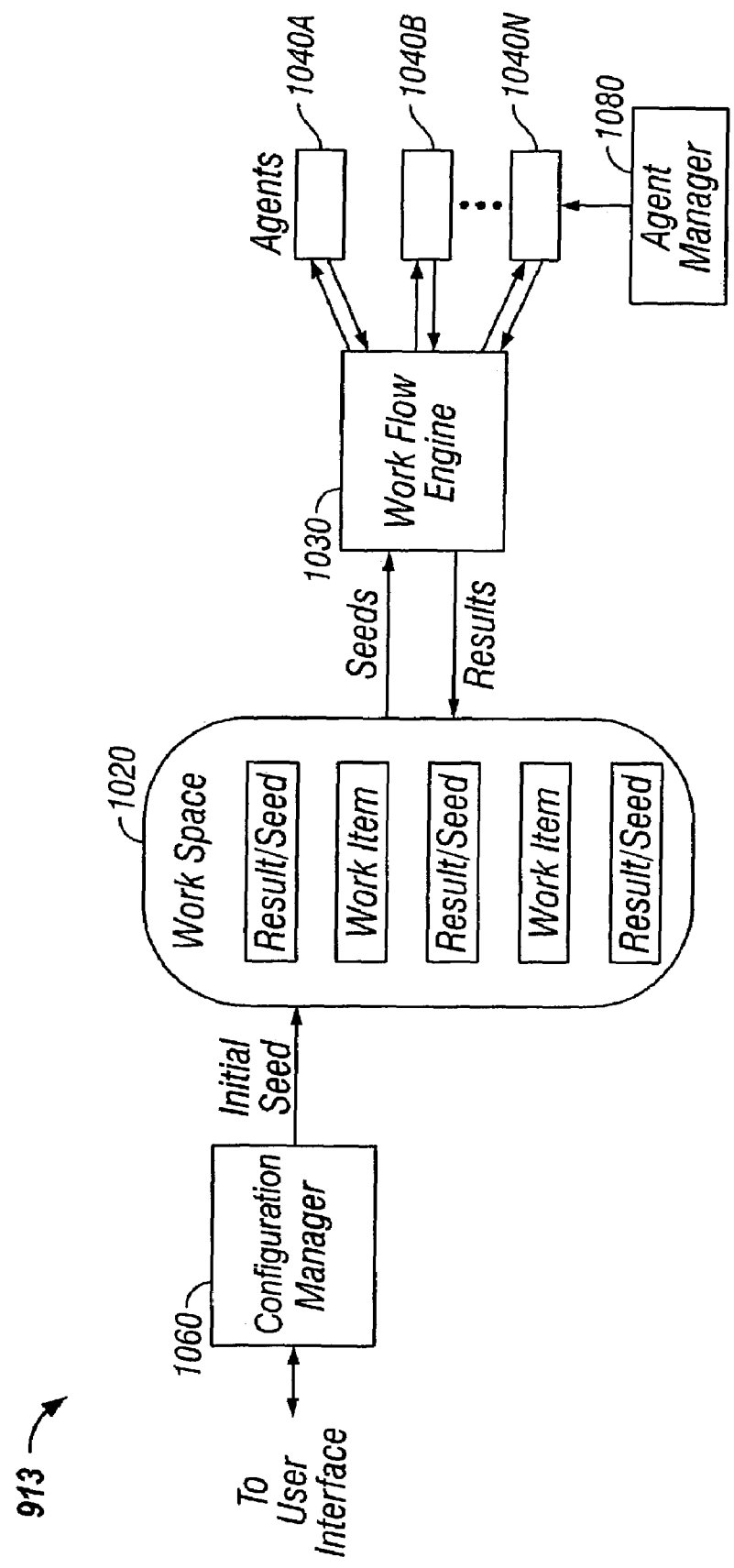
FIG. 10 is a diagram of one implementation of a configuration module.

FIG. 10 is a diagram of one implementation of a configuration module 913 suitable for implementing the configuration process 530. A similar architecture can be used to implement the installation and activation modules 912 and 914. The configuration module 913 includes a workspace 1020 that interacts with the following software modules: workflow engine 1030 and configuration manager 1060. The configuration module 913 also includes a number of agents 1040A-N and an agent manager 1080. The arrows in FIG. 10 indicate the direction of information flow. In this example, the workspace 1020 is implemented as a Java space and the services are Jini services.

The workspace 1020 typically contains results of tasks, which may also function as seeds for a next task. It can also contain unresolved work items, such as exceptions or a task awaiting user input. The workspace 1020 provides a snapshot of the current progress of the configuration process 530 and, in some sense, defines the current state of the process.

The workflow engine 1030 and agents 1040 carry out the actual configuration. The agents 1040 implement the tasks and communicate with the target devices. The agents 1040 can make use of protocol specific blades to communicate. For example, an SNMP blade can be used to communicate with network devices, while a JMX blade is used for applications. Agents 1040 can also be used to communicate with legacy software or other tools. For example, if the network tier is already managed using OpenView® software, an OpenView® agent 1040 can be used to integrate OpenView® into the configuration process. Application specific blades can aid in this process. For example, information can be exchanged with HP OV, SMARTS and NetCOOL® using these blades. The agents 1040 preferably are non-intrusive in nature. OPENVIEW is a registered trademark of Hewlett-Packard Co.: NETCOOL is a registered trademark of Micromuse, Inc.)

In one approach, there is a one-to-one correspondence between agents 1040 and tasks. One advantage of this approach is its modularity. New tasks can be implemented by adding new agents. Existing tasks can be updated simply by modifying the corresponding agent. The agent manager 1080 facilitates the process of adding, removing and/or updating agents 1040. It also attends to agent security. In this example, all agents 1040 use secure communications (e.g., using private keys) since they may handle sensitive information and/or may have superuser or similar access. The agent manager 1080 ensures that sensitive data is obtained only by authorized agents and reported results are coming from authorized agents.

The workflow engine 1030 implements the rules concerning which seed triggers which tasks, and which agent is responsible for that task. It also manages the overall workflow for the agents 1040 and communicates between the workspace 1020 and the agents 1040.

The configuration module 913 operates as follows. The configuration manager 1060 initiates the configuration process 530 by placing an initial seed into the workspace 1020. For example, the initial seed could be the name of the application. The workflow engine 1030 monitors the workspace 1020. When it sees the initial seed, the workflow engine 1030 dispatches the corresponding agent 1040 to execute the corresponding task. The results of the task (which could be simply notification that the task was completed) are reported by the agent 1040 to the workflow engine 1030, which places them into the workspace 1020. Some of these results may also be seeds for other tasks. If so, the workflow engine 1030 recognizes the seeds and dispatches the corresponding agents 1040. The process of looking for seeds in the workspace 1020, dispatching the corresponding agents 1040 and returning the results to the workspace 1020 is repeated until the configuration process 530 is completed. The results/seeds have a time to live so that the workspace 1020 does not become overly cluttered. The agents 1040 generally implement three methods: set seed, get result, and exceptions. The workflow engine 1030 also places pending work items, including exceptions, into the workspace 1020 and retrieves them once resolved.

The configuration manager 1060 is an interface to the user world. It generally monitors the progress of the configuration process 530, primarily by monitoring the workspace 1020.

Although the invention has been described in considerable detail with reference to certain preferred embodiments thereof, other embodiments will be apparent. For example, functionality is generally independent of its implementation. Functions described as implemented in software typically can also be implemented in hardware, firmware, etc., and vice versa. Therefore, the scope of the appended claims should not be limited to the description of the preferred embodiments contained herein.

What is claimed is:

1. A computer-implemented method for deploying an application comprising:
   accessing an application model of the application, the application model including a static description of the application and a run-time description of the application;
   installing packages on target devices to produce installations according to the static description, wherein the static description indicates network addresses of the target devices on which the packages are installed;
   configuring the installations on the target devices to produce configurations according to the run-time description, wherein the run-time description provides managed services and the locations on the target devices where they are to execute; and
   activating the configurations according to the run-time description.

2. The method of claim 1 wherein installing the packages comprises:
   checking-in packages, and
   installing checked-in packages.

3. The method of claim 2 wherein:
   the static description is capable of including static installation dependencies;
   the run-time description is capable of including run-time installation dependencies, configuration dependencies and activation dependencies; and
   wherein installing checked-in packages, configuring the installations and activating the configurations are executed according to static installation dependencies, run-time installation dependencies, configuration dependencies and activation dependencies included in the application model.

4. The method of claim 2 wherein installing checked-in packages comprises:
   pre-installing checked-in packages; and
   completing installation of the pre-installed packages post-cutover.

5. The method of claim 2 wherein at least one of the configurations is based on a software component architecture.

6. The method of claim 1 wherein the application model further includes a dependency affecting the executed phase further comprising:
   verifying the dependency before executing the phase.

7. The method of claim 6 wherein the dependency includes at least one of the:
   a static installation dependency if the executed phase includes installing packages; a run-time installation dependency if the executed phase includes configuring the installations; and
   a configuration dependency if the executed phase includes configuring the installations.

8. The method of claim 1 wherein the application model further includes a dependency affecting the executed phase, wherein executing the phase comprises executing the phase in an order according to the dependency.

9. The method of claim 8 wherein the dependency includes at least one of:
   a configuration dependency if the executed phase includes configuring the installations and
   an activation dependency if the executed phase includes activating the configurations.

10. The method of claim 1 wherein the deployment of the application is an update of a previous deployment.

11. The method of claim 1 wherein the deployment of the application is a roll back to a previous version of the deployment.

12. A computer-implemented method for installing an application comprising:
   determining, from an application model of the application, packages for the application, installations of packages indicating operations to perform to install the packages, and target devices for the installations; and
   installing the packages on the target devices according to the installations of the application model.

13. The method of claim 12 wherein the application model comprises a static description of the application, including identification of the packages and of the installations for the application.

14. The method of claim 13 wherein the application model further comprises a static installation dependency for at least one package, further comprising verifying the static installation dependency before installing the at least one package.

15. The method of claim 12 further comprising:
   checking-in packages, wherein the step of installing the packages comprises installing checked-in packages.

16. The method of claim 15 wherein checking-in packages includes version control of the packages.

17. The method of claim 15 further comprising:
   responsive to a check-in of an update of a package that was previously distributed, distributing the updated package as a replacement for the previously distributed package.

18. The method of claim 12 wherein the installing the packages comprises:

pre-installing at least one package; and completing installation of the pre-installed package after a cutover operation.

19. The method of claim 12, wherein the application model comprises a static description of the application, including at least one static installation dependency and identification of the packages and of the installations, further comprising:

checking-in at least one package; pre-installing the checked-in package;

verifying the static installation dependency before pre-installing the checked-in package; and completing installation of the pre-installed package after a cutover operation.

20. A computer-implemented method for configuring an application comprising:

determining, from an application model of the application, managed services for the application, configurations of the managed services, and installations on which the configurations are based indicating target devices on which the managed services are to be installed; and configuring the installations according to the application model to install the managed services on the indicated target devices.

21. The method of claim 20, wherein the application model comprises a run-time description of the application, including identification of the managed services and of the configurations for the application.

22. The method of claim 21, wherein the application model further comprises a run-time installation dependency for at least one configuration, further comprising verifying the run-time installation dependency before configuring the installations for the at least one configuration.

23. The method of claim 21, wherein the application model further comprises a configuration dependency for at least one configuration, further comprising verifying the configuration dependency before configuring the installations for the at least one configuration.

24. The method of claim 21, wherein the application model further comprises a configuration dependency and wherein the configuring the installations comprises configuring the installations in an order according to the configuration dependency.

25. The method of claim 21 wherein at least one configuration is based on software containers and process pools.

26. The method of claim 20 wherein at least one of the configurations is based on a software component architecture.

27. A computer apparatus for deploying an application comprising:

a port for accessing an application model of the application, the application model including a static description of the application and a run-time description of the application;

an installation module for installing packages on target devices to produce installations according to the static description, wherein the static description indicates network addresses of the target devices on which the packages are installed;

a configuration module for configuring the installations on the target devices to produce configurations according to the run-time description, wherein the run-time description provides managed services and the locations on the target devices where they are to execute; and an activation module for activating the configurations according to the run-time description.

28. The computer apparatus of claim 27, wherein the installation module installs packages by checking-in packages, and installing checked-in packages.

29. The computer apparatus of claim 28 wherein:

the static description is capable of including static installation dependencies;

the run-time description is capable of including run-time installation dependencies, configuration dependencies and activation dependencies; and the installation module, the configuration module and the activation module operate according to static installation dependencies, run-time installation dependencies, configuration dependencies and activation dependencies included in the application model.

30. The computer apparatus of claim 28 wherein the installation module installs checked-in packages by:

pre-installing checked-in packages; and completing installation of the pre-installed packages post-cutover.

31. The computer apparatus of claim 28 wherein at least one of the configurations is based on a software component architecture.

32. The computer apparatus of claim 27 wherein the application model further includes a dependency affecting operation of at least one module, and the affected module verifies the dependency.

33. The computer apparatus of claim 32 wherein the dependency includes at least one dependency that is a member of a set of dependencies comprising:

a static installation dependency if the affected module is the installation module;

a run-time installation dependency if the affected module is the configuration module; and a configuration dependency if the affected module is the configuration module.

34. The computer apparatus of claim 27 wherein the application model further includes a dependency affecting an order of operation of at least one module.

35. The computer apparatus of claim 34 wherein the dependency includes at least one dependency that is a member of a set of dependencies comprising:

a configuration dependency if the affected module is the configuration module;

an activation dependency if affected module is the activation module.

36. The computer apparatus of claim 27 wherein the deployment of the application is an update of a previous deployment.

37. The computer apparatus of claim 27 wherein the deployment of the application is a roll back to a previous version of the deployment.

\* \* \* \* \*